(12) United States Patent
Gaillard

(10) Patent No.: US 8,740,533 B2
(45) Date of Patent: Jun. 3, 2014

(54) FIXING MEMBER WITH A RECESS AT THE END OF ITS THREADED SHANK, A MALE ELEMENT, A HANDLING TOOL AND A GAUGE COMPRISING SUCH A MALE ELEMENT

(75) Inventor: Arnaud Gaillard, Massy (FR)

(73) Assignee: Lisi Aeropsace (FR)

( * ) Notice: Subject to any disclaimer, the term of this patent is extended or adjusted under 35 U.S.C. 154(b) by 218 days.

(21) Appl. No.: 13/301,291

(22) Filed: Nov. 21, 2011

(65) Prior Publication Data

US 2012/0255189 A1 Oct. 11, 2012

(30) Foreign Application Priority Data

Nov. 24, 2010 (FR) ...................................... 10 59674

(51) Int. Cl.
*F16B 23/00* (2006.01)
*G01B 3/46* (2006.01)
*B25B 15/00* (2006.01)

(52) U.S. Cl.
USPC ........................... 411/403; 33/501.45; 81/460

(58) Field of Classification Search
USPC .................... 33/501.08, 501.09, 501.45, 542; 81/121.1, 436, 460, 461; 411/402, 403
See application file for complete search history.

(56) References Cited

U.S. PATENT DOCUMENTS

| | | | |
|---|---|---|---|
| 2,514,956 A * | 7/1950 | Kuebler | 33/501.45 |
| 4,512,220 A * | 4/1985 | Barnhill et al. | 81/121.1 |
| 5,435,680 A * | 7/1995 | Schuster | 411/404 |
| 6,632,057 B1 | 10/2003 | Fauchet | |
| 7,225,710 B2 * | 6/2007 | Pacheco, Jr. | 81/460 |
| 2006/0130618 A1* | 6/2006 | Hsieh | 81/121.1 |
| 2012/0137842 A1* | 6/2012 | Guo et al. | 81/460 |

FOREIGN PATENT DOCUMENTS

| | | |
|---|---|---|
| DE | 10 2004 022852 A1 | 9/2005 |
| FR | 2 809 781 A1 | 12/2001 |
| JP | 2004197908 A * | 7/2004 |

OTHER PUBLICATIONS

Heinzler, Markus, European Demand and Search Report, EP 11183813, Feb. 16, 2012, 3 pages, EPO.
INPI France Institut National de la Propriete Industrialle; France Search Report for FA 744537 and FR 1059674; Feb. 15, 2011; 5 pages.

* cited by examiner

*Primary Examiner* — R. A. Smith
(74) *Attorney, Agent, or Firm* — Henricks, Slavin & Holmes LLP

(57) ABSTRACT

A fixing member comprises a threaded end, one end face of which contains a recess capable of housing a tip, complementary in shape, said recess comprising a peripheral edge in the form of a multilobed continuous curved line. The cross-section of each lobe L is defined by a continuous series of three arcs of a circle, i.e. a first convex arc of a circle with a first radius ($R_1$), on either side of which a second concave arc of a circle with a second radius ($R_2$) are positioned. Each lobe is connected to the adjacent lobe via a third convex arc of a circle with a third radius ($R_3$, $R_{3u}$) larger than the first radius ($R_1$). The invention also relates to a male element with a raised shape complementing that of the recess, in addition to a handling tool and a testing gauge comprising such a male element.

17 Claims, 5 Drawing Sheets

FIXING MEMBER WITH A RECESS AT THE END OF ITS THREADED SHANK, A MALE ELEMENT, A HANDLING TOOL AND A GAUGE COMPRISING SUCH A MALE ELEMENT

TECHNICAL FIELD

The invention relates to a fixing member comprising a threaded end, one end face of which has a recess capable of cooperating with a handling tool or testing gauge, a male element, raised in shape, capable of being inserted into a recess of a fixing member, in addition to a handling tool and testing gauge comprising such a male element.

This type of fixing member is intended to be associated with a nut so as to assemble at least two parts from a single side of the assembly.

One preferred application of the invention can be found in the aeronautics industry. However, this invention may be used in any other industrial field, in particular in the event that access to one of the sides of the parts being assembled is difficult.

PRIOR ART

Document FR2809781 is known and relates to a fixing member comprising a head and a threaded end, an end face of which has a recess, multilobed in shape, intended to cooperate with a tool with a corresponding shape. The multilobed shape enables significant tightening torque to be applied and also avoids the formation of cracks in the metal making up the fixing member, in particular in the event that the thread is produced by rolling after the recess has been obtained by plastic deformation of the metal. According to one embodiment, the lobes of the recess are formed by an outer arc of a circle and by two flat lateral faces, the adjacent lobes therefore being connected by inner arcs of a circle tangent to the flat faces. According to another embodiment, the lobes of the recess are formed by an outer arc of a circle with two inner arcs of a circle with a larger curve radius.

Such a fixing member is used in the following manner: it is placed in an opening made through at least two structures being assembled, with its head resting on one side of the structures being assembled. A nut is placed on the other side of the structures on the threaded end protruding from the opening. A handling tool, comprising a raised tip complementing the recess of the fixing member, inserts the tip into the recess so as to maintain the fixing member fixed in rotation in relation to the structures being assembled. This same tool, also comprising means for tightening a nut, screws the nut onto the threaded end maintained fixed in rotation by the tip of the tool, by developing a certain level of tightening torque. This torque is all the more significant when the nut is a lock nut and/or when the stress increases within the assembly. A reaction torque is therefore produced between the recess of the threaded end and the tip, which tends to make the end pivot within the recess of the fixing member. Thanks to the complementary multilobed shapes and to the specific dimensions of the recess and the raised shape, no damage appears in the ring-shaped region located around the peripheral edge of the recess and the nut is screwed onto the fixing member in a satisfactory manner.

Although this recess provides a significant improvement with regard to the hexagonal recesses well known in the prior art, the maximum torque at which the fixing member may be assembled onto the assembly without excessive deformation is limited. Any increase in torque beyond this limit causes deformations, in particular to the tips of the tightening or removing tool.

One purpose of the invention is therefore to provide a threaded fixing member capable of being assembled with more torque than that of the fixing members in the prior art. The invention also relates to a male element with a shape complementing that of the recess, which has improved torque strength.

DESCRIPTION OF THE INVENTION

The invention relates to a fixing member with a threaded end, one end face of which has a recess, multilobed in shape, designed to avoid the appearance of cracks in the threaded end in the event that the thread is produced by rolling after the recess has been obtained by forging, expanding or machining. This recess also enables the member to support a more significant level of reaction torque without affecting its traction or fatigue behaviour and in particular in the threaded end.

According to the invention, this result is obtained by means of a fixing member extending along an axis of symmetry, comprising a threaded end, one end face of which contains a recess. The recess comprises a peripheral edge in the form of a multilobed continuous curved line, the cross-sections of each lobe being defined by a continuous series of three arcs of a circle, i.e. a first convex arc of a circle with a first radius, on either side of which a second concave arc of a circle with a second radius are positioned. Each lobe is connected to the adjacent lobe via a third convex arc of a circle with a third radius larger than the first radius.

Tests performed by the applicant have demonstrated that the stresses that developed in the threaded end were confined and of a low level when a tool is inserted into the recess and when a nut is screwed onto the outer thread of the fixing member. The level of deformation of this same end is thus low.

The invention also relates to a male element that can be incorporated into a handling tool or a testing gauge.

According to the invention, the male element is capable of being inserted into a complementary recess of a fixing member. It has a raised shape comprising a peripheral edge in the form of a multilobed continuous curved line. The cross-sections of each lobe are defined by a continuous series of three arcs of a circle, i.e. a first convex arc of a circle with a first radius, on either side of which a second concave arc of a circle with a second radius are positioned. Each lobe is connected to the adjacent lobe via a third convex arc of a circle with a third radius larger than the first radius.

Tests performed by the applicant have demonstrated that the stresses that developed in such a male element assembled at the end of a handling tool and subject to reaction torque were also confined and of a low level. Therefore, the outer shape of the male element is solicited to a lesser degree under the same reaction torque created by the fixing of a nut.

The invention also relates to a handling tool comprising a male element according to the invention.

The invention also relates to a testing gauge comprising a male element according to the invention.

BRIEF DESCRIPTION OF THE FIGURES

The invention and its advantages will be better understood after reading the following description, which is provided for purposes of illustration only and with reference to the accompanying figures, wherein.

DETAILED DESCRIPTION OF THE INVENTION

Figure 1:
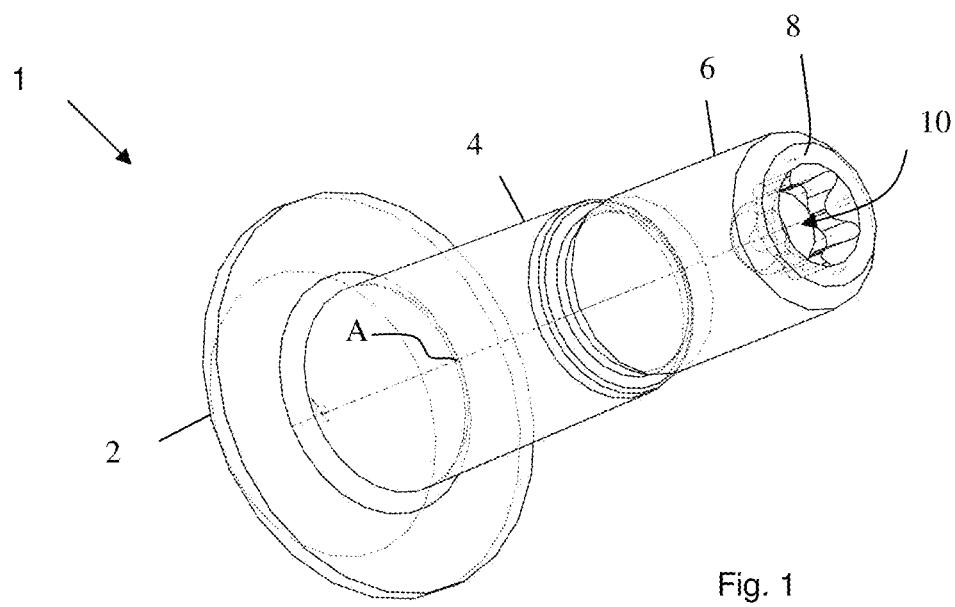
FIG. 1 is a perspective view of a fixing member with a multilobed recess according to one embodiment of the invention.

FIG. 1 represents a fixing member 1 according to one embodiment of the invention. This member can be made from any metal, and preferably, for application in the aeronautics industry, from a metal with a high limit of elasticity and with low plastic deformation such as a titanium alloy.

The fixing member 1 extends along an axis of symmetry A and comprises a head 2 at one end, intended to rest on one side of a stack of structures being assembled, not represented, in addition to a substantially smooth shank 4, intended to cross a bore made in the stack of structures. This shank can be cylindrical or conical in shape. The fixing member 1 also comprises a threaded end 6 intended to protrude from the other end of the stack of structures. In FIG. 1, the thread is not represented for clarity purposes. The threaded end 6 has an end face 8 onto which a recess 10 is produced. The recess 10 extends within the threaded end 6 over a certain distance and in this example has a conical base.

Figure 2:
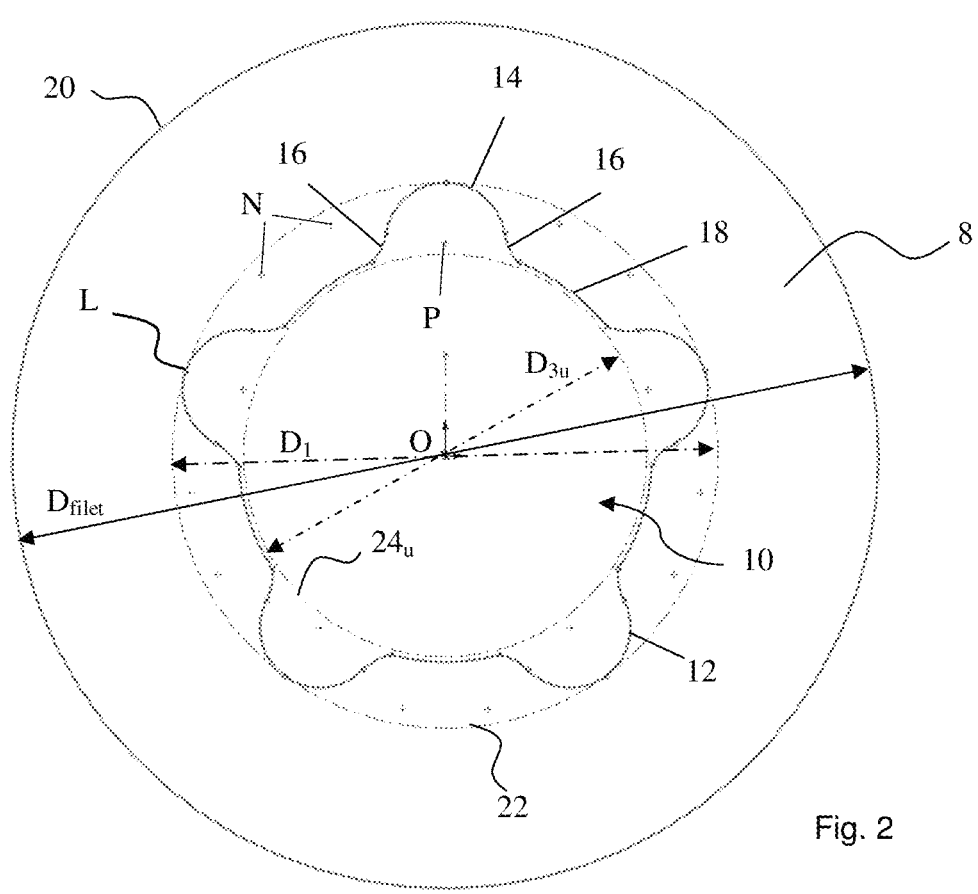
FIG. 2 is an end view of the threaded end of a fixing member with a multilobed recess according to one embodiment of the invention.

FIG. 2 represents a cross-section of the recess 10 on the end face 8. The recess 10 comprises a peripheral edge 12 which forms a continuous multilobed line when the fixing member is viewed from its end. The peripheral edge 12 comprises five identical lobes L, evenly distributed on the peripheral edge 12. Advantageously, the number of lobes is at least three, so as to pass a sufficient level of torque. Advantageously, the number of lobes is less than or equal to seven. Beyond this number, the method of manufacturing could generate the undesired radial expansion of the threaded end 6 according to the diameter of the thread.

Preferably, the lobes are positioned so that any two lobes are not diametrically opposed so as to limit the radial deformation of the threaded end 6. More preferably, the number of lobes is uneven so as to limit any cracks from appearing during thread rolling.

The cross-section of each lobe L is formed by a continuous series of three arcs of a circle, i.e.:
a first convex arc of a circle 14 with a first radius $R_1$,
two second concave arcs of a circle 16 with a second radius $R_2$, positioned either side of the first convex arc of a circle 14.

Each lobe L is connected to the adjacent lobe L via a third convex arc of a circle 18 with a third radius $R_3$ larger than the first radius $R_1$.

Figure 3:
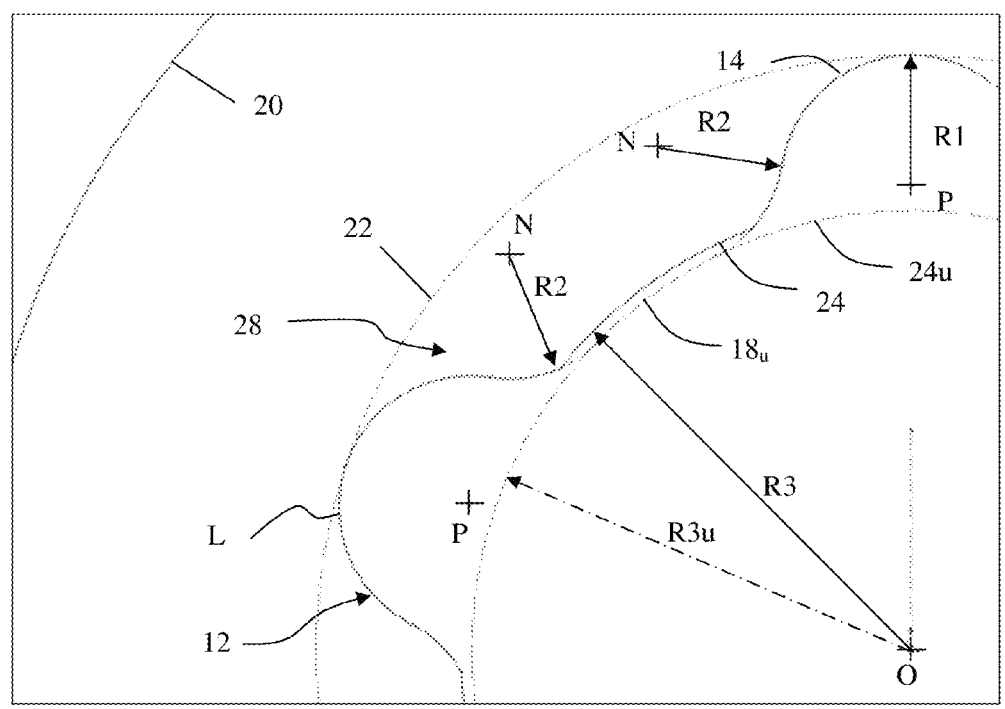
FIG. 3 is a close-up end view of a part of the threaded end of the fixing member with a multilobed recess according to one embodiment of the invention.

As represented more precisely in FIG. 3, the solid line tracing the peripheral edge 12 is that of a recess 10 produced according to a first embodiment of the invention. The radii $R_1$ and $R_2$ are tangent in their connection points.

According to a second embodiment, the recess 10 has a third convex arc of a circle $18_u$ with a third radius $R_{3u}$, represented as a dotted line in FIGS. 2 and 3, slightly smaller than $R_3$ by several microns and therefore still larger than the first radius $R_1$. In the latter example, the two arcs of a circle 16 are slightly longer so as to be tangent to the ends of the third arc of a circle $18_u$. The radii $R_1$ and $R_2$, and $R_2$ and $R_{3u}$ are tangent in their connection points.

The end face 8 has an outer circumference 20 generally circular in shape, with a diameter $D_{filet}$ corresponding to the diameter of the thread base of the threading, i.e. to the diameter of the threaded end 6 at the bottom of the threads.

When viewed from its end, the peripheral edge 12 of the recess 10 is fully inscribed in a circle 22 of diameter $D_1$. In other words, all of the peaks of lobes L are located on the circle 22.

The recess 10 has a central cylindrical hollow 24, $24_u$ with a third radius $R_3$, $R_{3u}$ or even with a diameter $D_3$, $D_{3u}$.

Therefore, all of the points of the peripheral edge 12 are included within a ring-shaped space 28 defined by circles 24, $24_u$ and 22.

Circles 20, 22 and 24, $24_u$ have the same centre point O, the centre of the recess 10. This point O is ideally located on the axis of symmetry A of the fixing member 1.

The first convex arcs of a circle 14 with a radius $R_1$ each have the centre point P. All of the points P are located on a unique circle with a centre O and with a diameter calculated so that this circle is located within the ring-shaped space 28.

The two concave arcs of a circle 16 each have a centre point N. All of the points N are located on a unique circle with a centre O and with a diameter calculated so that this circle is located within the ring-shaped space 28.

The recess 10 can be produced in several different ways.

A first method involves broaching or expanding, which consists in:
firstly boring the threaded end 6 to a diameter $D_3$ using a drill
secondly broaching or expanding the multilobed shape using a punch with a multilobed raised shape capable of creating hollow lobes L.

This method of manufacture is simple and fast, however requires the adjustment of punches adapted to suit each diameter.

A second method involves machining. This consists in machining the recess 10 with a programmed machine tool that removes the material so as to obtain a multilobed recess, the central hollow 24, $24_u$ of which has a diameter equal to twice the third radius $R_3$, $R_{3u}$. This method of manufacture is not as fast as the former, however is more flexible, as the same machine tool can be used to produce several different recess sizes.

A third method involves forging. This consists in hitting this end with a shaping punch so as to create the multilobed shape in a single step.

According to the method of manufacturing the selected recess 10, the thread 6 can be produced either before the formation of the recess 10 or afterwards.

In any event, there is a risk of bulging occurring in the end if the circle of inscription 22 for recess 10 is not dimensioned to avoid this effect.

According to one embodiment of the invention, the diameter $D_1$ of the circle of inscription 22 for the recess 10 is defined as being equal to the result of the diameter of the thread base $D_{filet}$ over a coefficient $\gamma$ of between approximately 1.32 and approximately 1.72. The term approximately in this instance and hereinafter in the description can be understood as meaning that a margin of several percent is acceptable.

$$D_1 = D_{filet}/\gamma$$

This coefficient guarantees that for whatever selected method of manufacture, the diameter $D_{filet}$ of the threaded end 6 will not increase. This therefore assures that the diameter $D_{filet}$ remains within the tolerance limits set for the fixing member 1.

The diameter $D_3$, $D_{3u}$ of the central hollow 24, $24_u$ is defined as being a fraction of $D_1$, according to the formula:

$$D_3 = \delta \times D_1,$$

$$\text{Or } D_{3u} = \delta \times D_1,$$

$\delta$ being a coefficient of between approximately 0.63 and approximately 0.88.

This coefficient ensures that the contact surface between the inner walls of the recess 10 and the outer walls of the tool being inserted is sufficient to transmit the required torque. The smaller this coefficient, the larger the contact surface. From the $D_3$, $D_{3u}$ calculation, the radius $R_3$, $R_{3u}$ of the third convex arc 18, $18_u$ is deduced.

The first radius $R_1$ is defined according to the average diameter of the recess 10, i.e. according to the half-sum of the diameter $D_1$ and the diameter $D_3$, $D_{3u}$.

This is equal to:

$$R_1 = \tfrac{1}{2} \times (D_1 + D_3) \times \lambda,$$

$\lambda$ being a coefficient of between approximately 0.06 and approximately 0.26.

This coefficient $\lambda$ enables a lobe L to be obtained with a surface area relatively proportional to the surface area of the recess. It assures that the lobe is not too small, which would create too much stress in the peripheral zone of the lobe, nor too big, which would lead to deformation risks when a tip of a handling tool is inserted into the recess 10.

The second radius $R_2$ is defined as being a fraction of the first radius $R_1$. Typically, $$R_2 = K \times R_1,$$

K being a coefficient of between approximately 0.66 and approximately 1.06.

This coefficient K connects the radii $R_1$ and $R_2$ so as to ensure an optimal contact surface between the recess 10 and the tip of a handling tool.

Thanks to this specific geometry, the recess 10 has a central cylindrical hollow 24, $24_u$, the diameter $D_3$, $D_{3u}$ of which is increased in relation to the diameter of the central hollow of the multilobed recesses from the prior art. This characteristic enables more reaction torque to be passed within the system when a tool is inserted into the recess 10 and maintains the fixing member 1 fixed in rotation during a tightening operation of a nut on a threaded end 6.

The two concave arcs of a circle 16 ensure a transition without an acute angle between the first arcs of a circle 14 and the third arcs of a circle 18, $18_u$. Their concave shape also creates a pressure point on the tool, thus improving the holding of the tool in the lobes L.

The ranges of coefficients $\gamma$, $\delta$ and K take into account the possible number of lobes of the recess 10 and the diameter of the fixing member 1. Compliance with these values enables the development of a large enough surface area of the inner walls of the lobes, to maintain the tip of the tool within the recess without the latter sliding under the reaction force. The surface area is maximised to enable the passage of a maximised level of torque. The deformation risks for the recess are also minimised.

The invention also relates to a male element with a raised shape, capable of being inserted into a recess 10 according to the invention, as previously described. Such a male element may make up an end of a tip assembled onto a nose of a motorised or manual handling tool, or make up an end of a manual handling tool such as a wrench.

Figure 4:
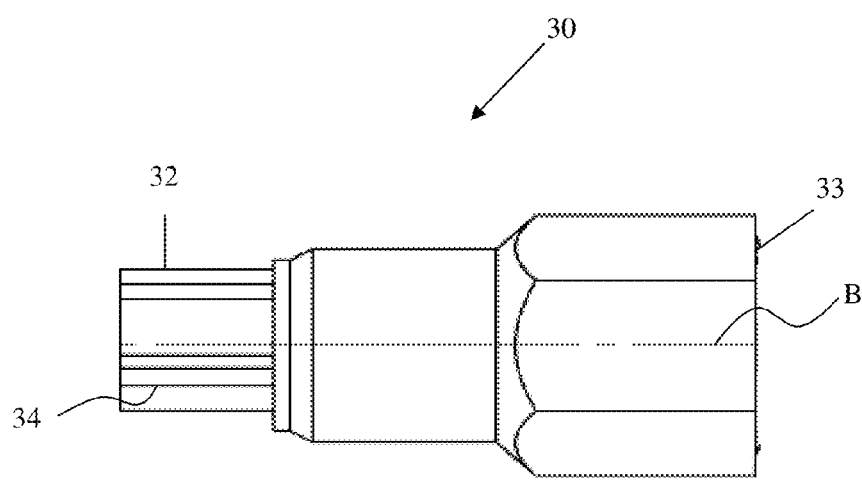
FIG. 4 is a side view of a tip according to one embodiment of the invention, with a multilobed raised shape.
Figure 5:
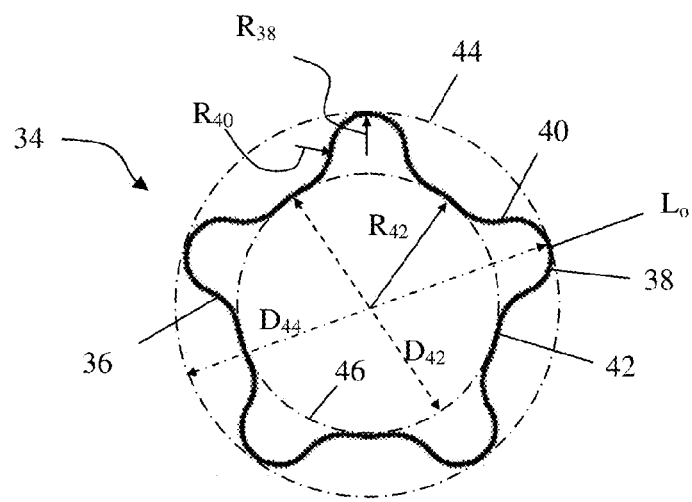
FIG. 5 is an end view of an end of a tip according to one embodiment of the invention, with a multilobed raised shape.

FIG. 4 represents a tip 30 of a handling tool, extending along an axis of symmetry B and comprising an end 32 of a male element according to one embodiment of the invention. The other end 33 of the tip is suitable for being assembled within the tool. The end 32 is a male element 34, raised in shape, with a peripheral edge 36, the cross-section of which, as represented in FIG. 5, is a multilobed continuous curved line. According to one preferred embodiment of the invention, the peripheral edge 36 comprises five identical lobes $L_o$, evenly distributed on the peripheral edge 36. Alternatively, the number of lobes is at least three and at most seven lobes so as to adapt to the shape of the recess 10.

As the male element 34 is complementary in shape to the recess 10, the cross-section of each lobe $L_o$ is formed by a continuous series of three arcs of a circle, i.e.:
a first convex arc of a circle 38 with a first radius $R_{38}$,
two second concave arcs of a circle 40 with a second radius $R_{40}$, positioned either side of the first convex arc of a circle 38.

Each lobe $L_o$ is connected to the adjacent lobe $L_o$ via a third convex arc of a circle 42 with a third radius $R_{42}$ larger than the first radius $R_{38}$.

When viewed from its end, the peripheral edge 36 is fully inscribed in a circle 44 of diameter $D_{44}$.

Thanks to this specific geometry, the end 32 of the tip 30 has, in particular, a central cylindrical section 46, the diameter $D_{42}$ of which—equal to twice the third radius $R_{42}$—is increased in relation to the diameter of the central section of the tools from the prior art. This characteristic enables more reaction torque to be passed when the tip 30 is inserted into the recess 10 and maintains the fixing member 1 fixed in rotation during a tightening operation of a nut on the threaded end 6, for the same shank diameter of a fixing member from the prior art.

Figure 6:
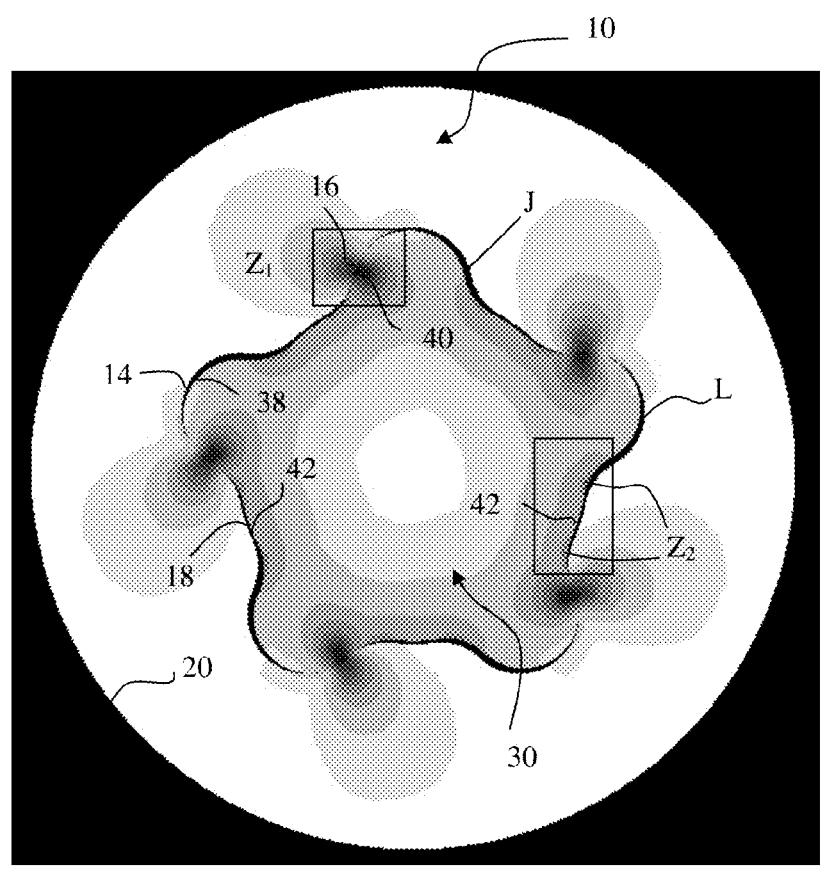
FIG. 6 is a schematic representation of the stresses that developed within a system viewed from its transversal cross-section, said system comprising a tip according to one embodiment of the invention, assembled onto a handling tool, the tip being inserted into a recess according to one embodiment of the invention, and subject to reaction torque.

The male element 34 is preferably configured so that, when the tip 30 is inserted into the raised recess 10, a suitable clearance J exists—visible in FIG. 6—between the outer walls of the male element 34 and the inner walls of the recess 10.

The clearance J is chosen so that the tip can be easily inserted and removed from the recess 10, even in the presence of additional material such as a sealant or paint.

The diameter $D_{44}$ of the circle of inscription 44 is defined according to the diameter $D_1$ of the recess 10 into which the tip 30 is intended to be inserted, taking into account the required manufacturing tolerances and clearance J.

The diameter $D_{42}$ of the central cylindrical section 46 is calculated according to this diameter $D_{44}$, using the formula:

$$D_{42} = \delta \times D_{44},$$

δ being the same coefficient as that used for the recess 10, of between approximately 0.63 and approximately 0.88. The third radius $R_{42}$ is directly deduced by dividing the diameter $D_{42}$ of the central cylindrical section 46 by two.

The first radius $R_{38}$ is defined according to the average diameter of the end 32, i.e. according to the half-sum of the diameter $D_{44}$ of the circle of inscription 44 and the diameter $D_{42}$ of the central cylindrical section 46.

This is equal to:

$$R_{38} = \tfrac{1}{2} \times (D_{42} + D_{44}) \times \lambda,$$

λ being the same coefficient as that used for the recess 10, of between approximately 0.06 and approximately 0.26.

The second radius $R_{40}$ is defined as being a fraction of the first radius $R_{38}$. Typically:

$$R_{40} = K \times R_{38},$$

K being the same coefficient as that used for the recess 10, of between approximately 0.66 and approximately 1.06.

FIG. 6 shows the stresses simulated by finished elements, developed within a system comprising a tip 30 born by or integrated into a handling tool, the end 32 of which according to one embodiment of the invention is inserted into a recess 10 according to one embodiment of the invention, with a diameter of half an inch or 12.70 mm, and subject to a reaction torque of 2.66 N.m.

The contact zones are limited to the two arcs of a circle 16 of the recess 10 and 40 of the end 32, on one side of each lobe L according to the direction of rotation of the tip in reaction to the tightening of a nut on the threaded end 6.

In one of these zones, identified in the figure by the rectangular zone $Z_1$, the stresses can be clearly seen as confined, whether this is in the threaded end 6 or in the end 32. In particular, they do not reach the peripheral edge of the threaded end.

The stresses are almost zero in the first arcs of a circle 14 and third arcs of a circle 18 of the recess 10, and low in the first arcs of a circle 38 and third arcs of a circle 42 of the end 32. Two very localised and very low stress zones $Z_2$ appear in the third arcs of a circle 42 of the end 32.

Figure 7:
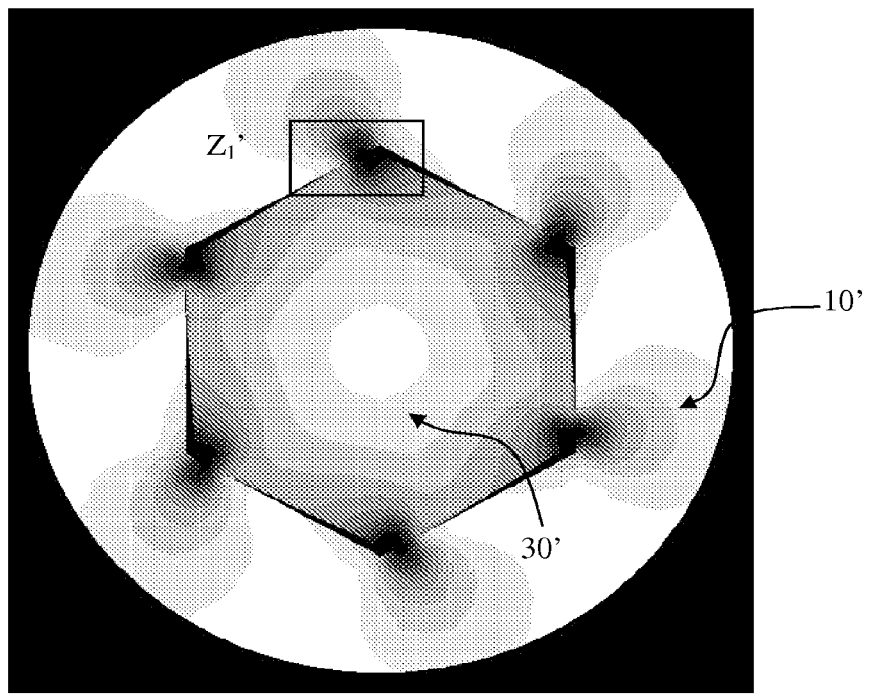
FIG. 7 is a schematic representation of the stresses that developed within a system viewed from its transversal cross-section, said system comprising a hexagonal tip assembled onto a handling tool and inserted into a hexagonal recess from the prior art, with the tip being subject to reaction torque.

FIG. 7 represents the stresses calculated per finished element generated within a hexagonal recess 10' with six socket faces from the prior art and within a hexagonal tip 30' inserted into the recess 10' and subject to torsional moment. The stress scale is the same as that in FIG. 6. For the same thread diameter and at constant torque, the stresses within the recess 10' and the tip 30' identified by the zone $Z_1'$ are clearly higher and more widespread than those generated within a multilobed recess 10 and within a tip 30 according to one embodiment of the invention.

Figure 8:
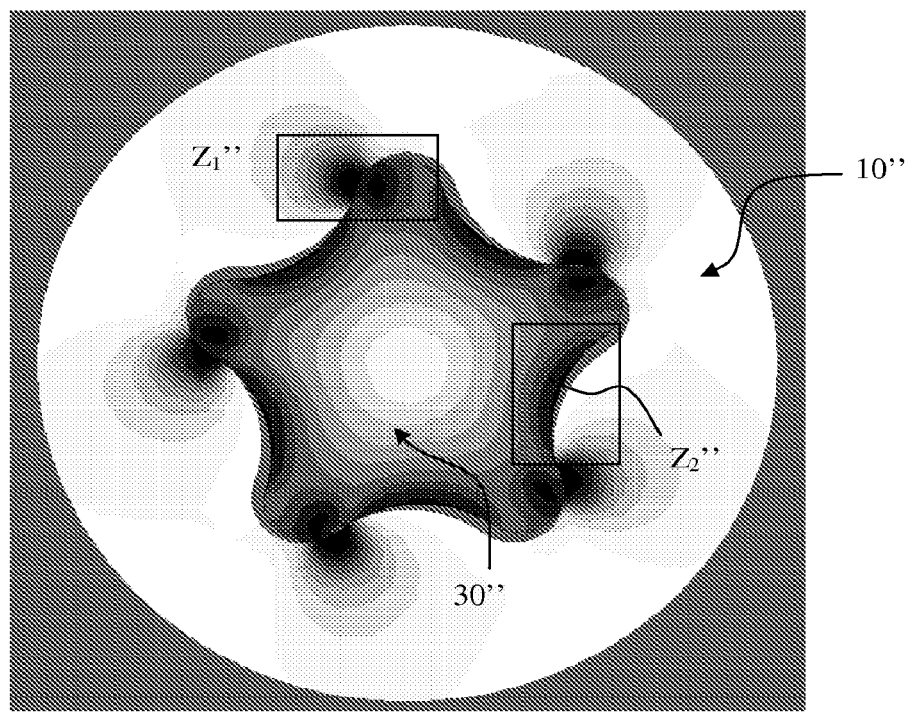
FIG. 8 is a schematic representation of the stresses that developed within a system viewed from its transversal cross-section, said system comprising a multilobed tip from the prior art, assembled onto a handling tool and inserted into a multilobed recess from the prior art, with the tip being subject to reaction torque.

FIG. 8 represents the stresses calculated per finished element generated within a multilobed recess 10" from the prior art and within a multilobed tip 30" inserted into the recess 10" and subject to torsional moment. The stress scale is the same as that in FIGS. 6 and 7. For the same thread diameter and at constant torque, the stresses within the recess 10" and the tip 30" identified by the zone $Z_1''$ are clearly higher and more widespread than those generated within a multilobed recess 10 and within a tip 30 according to one embodiment of the invention.

Moreover, stresses clearly appear within all connection zones $Z_2''$ in the form of a convex arc of a circle between the lobes. Their level and range are clearly higher than those of the stresses developed in an end 34 according to the invention.

This means that a tip 30 with a male element 34 according to the invention, inserted into a recess 10 and subject to torque, will undergo little deformation: breakage of the tip 30 will occur less often. More fixing members 1 can therefore be tightened with the same tip 30. Indeed, the concave shape of the third arcs of a circle 18, 42 of the recess 10 and tip 30 respectively, reduce the solicitations and permanent deformations occurring on the outer diameter of the tip 30.

Thanks to this specific shape, the recess 10 according to the invention enables the transmission, using the same diameter, same torque and same materials, of up to 20% more torque compared to a multilobed recess from the prior art, and up to 60% more torque compared to a hexagonal recess from the prior art, before undergoing plastic deformation.

The invention also relates to a testing gauge 50 for checking the conformity of a recess 10 according to one embodiment of the invention, as previously described, comprising an end in the shape of a male element as previously described.

Indeed, after manufacturing the recess according to one of the described methods, the conformity of the recess 10 with the manufacturing drawing is often checked during the quality control for the fixing member 1.

Figure 9:
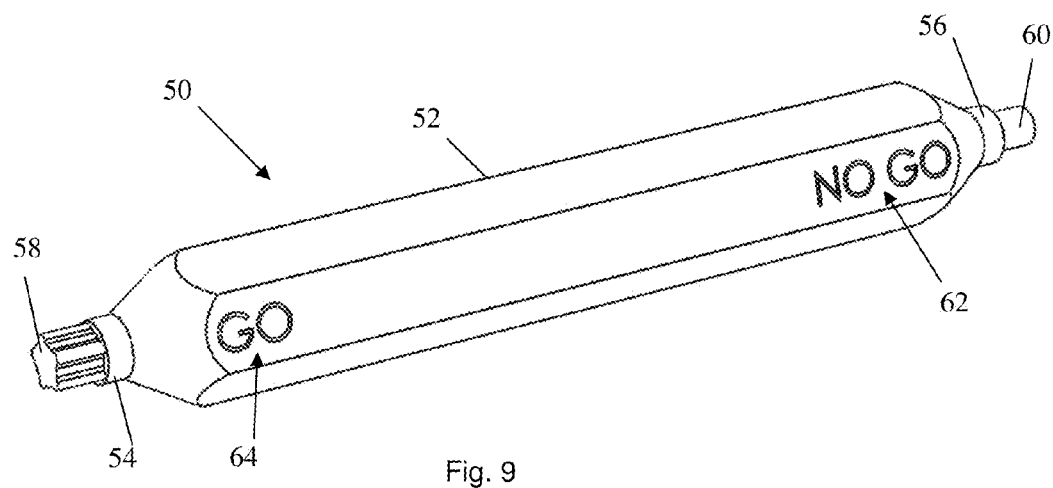
FIG. 9 is a perspective view of a testing gauge for a recess according to one embodiment of the invention, one end of which is equipped with a multilobed, raised male element according to one embodiment of the invention.

For this purpose, a testing gauge 50 as represented in FIG. 9 comprises a grippable body 52, with an overall elongated shape, with two opposite ends 54 and 56. A first end 54 comprises a first male element 58 identical to the male element 34 previously described. In an alternative embodiment not represented, the body of the gauge can have a shape comprising several ends, such as a cross or a star.

The cross-section of each raised lobe of the first male element 58 is therefore formed by a continuous series of three arcs of a circle, i.e.:
  a first convex arc of a circle with a first radius,
  two second concave arcs of a circle with a second radius, positioned either side of the first convex arc of a circle.

Each lobe is connected to the adjacent lobe via a third convex arc of a circle with a third radius larger than the first radius.

The raised form is preferably configured so that, when the male element 58 is inserted into the recess 10, a suitable clearance exists between the outer walls of the raised form and the inner walls of the recess 10. This clearance is however smaller than the clearance J selected for the male element 34 used for the tip 30.

The dimensions of the first male element 58—lobe radii, diameters of the central cylindrical section—are defined in the same way as those of the male element 34, to the nearest level of clearance; the dimensioning rules will therefore not be repeated hereinafter.

This first male element 58 checks that the peripheral edge 12 of the recess 10 does not have any radius smaller than those defined by the manufacturing drawing. If the male element 58 does not enter into the recess 10, the fixing member 1 must therefore be discarded for reasons of non-conformity.

If the first male element 58 can be inserted into the recess 10, the operator must check that certain dimensions are not too large. For this purpose, the gauge 50 comprises, at a second end 56, a second male element 60 with a circular cross-section for example, and with a radius larger than the third radius $R_3$ of the recess 10. This second male element 60 checks that the diameter of the central cylindrical hollow 24, $24_u$ is not too large in relation to the diameter $D_{42}$ of the central cylindrical section 42 of a tip 30, which will be used to maintain the fixing member 1 fixed when tightening the nut.

Figure 10:
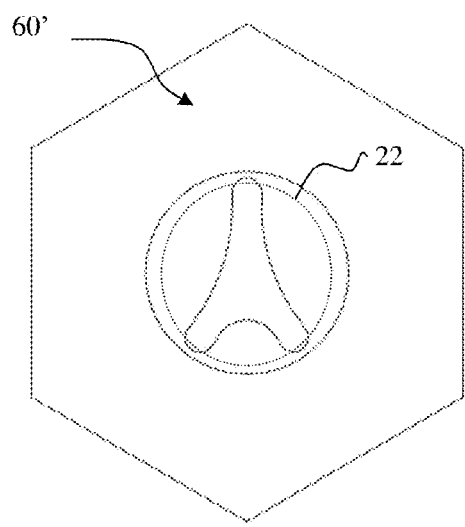
FIG. 10 is an end view of an end of a testing gauge intended to check a dimension of a multilobed recess according to one embodiment of the invention.

Alternatively, as represented in FIG. 10, the end 56 can be fitted with a third male element 60' comprising three lobes, the cross-section of each lobe peak being formed by a convex arc of a circle with a radius smaller than the first radius $R_1$ of the recess 10 being checked. The centres of these radii are positioned on a circle so that the third male element 60' is inscribed in a circle with a diameter larger than the diameter $D_1$ of the circle of inscription 22 of the recess 10. This element 60' checks that the diameter $D_1$ of the recess 10 is not too large.

Figure 11:
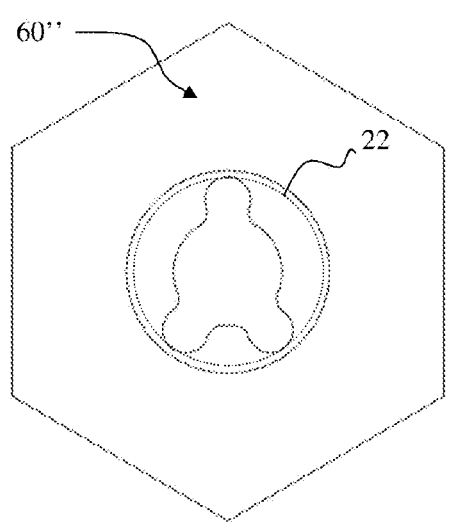
FIG. 11 is an end view of an end of a testing gauge intended to check another dimension of a multilobed recess according to one embodiment of the invention.

Alternatively, as represented in FIG. 11, the end 56 can be fitted with a fourth male element 60" comprising three lobes. The cross-section of each lobe peak is formed by a convex arc of a circle with a radius slightly larger than the first radius $R_1$ of the recess 10 being checked. The centres of these radii are positioned on a circle so that the third male element 60" is inscribed in a circle with a diameter smaller than or equal to the diameter $D_1$ of the circle of inscription 22 of the recess 10. This element 60" checks that the first radius $R_1$ of the recess 10, is not too large in relation to the first radius of a tip 30, which will be used to maintain the fixing member 1 fixed when tightening the nut.

The end 56 comprising a third or a fourth male element 60', 60" is inserted then removed several times from the recess 10, by successively rotating the gauge, so as to check all lobes. If one of the male elements 60', 60" enters into the recess 10, the fixing member 1 must be discarded for reasons of non-conformity.

Indeed, if one of the dimensions of the male elements 60, 60' or 60" is larger than the maximum acceptable dimension, too much clearance exists between the end 32 of a tip 30 and the recess 10 and the contact surfaces will not be dimensioned to transmit the maximum torque permitted. This can lead to the deterioration of the lobes L of the recess 10 and/or of the tip 30.

The body 52 of the testing gauge comprises at least one non-conformity indicator 62 for the recess 10 being checked, located near to the second end 56, bearing one of the second, third or fourth male elements 60, 60' or 60". In the example illustrated, the visual statement "NO GO" is displayed, which informs the operator that if the male element 60, 60' or 60" enters into the recess 10, this fixing member 1 must be discarded for reasons of non-conformity.

The testing gauge can also comprise a conformity indicator 64 for the recess being checked, located on the body 52 of the gauge 50, near to the first end 54. In the example illustrated, the visual statement "GO" is displayed. Evidently, any other conformity or non-conformity indicator can be a visual indicator written in the operator's language or can be comprised from any other appropriate sign, colour or raised marking, such as braille.

The invention claimed is:

1. A fixing member extending along an axis of symmetry comprising a threaded end, one end face of which contains a recess, said recess comprising a peripheral edge in the form of a multilobed continuous curved line, characterised in that the cross-section of each lobe is defined by a continuous series of three arcs of a circle, i.e. a first convex arc of a circle with a first radius, on either side of which a second concave arc of a circle with a second radius are positioned, and in that each lobe is connected to the adjacent lobe via a third convex arc of a circle with a third radius larger than the first radius.

2. A fixing member according to claim 1, characterised in that the peripheral edge of the recess is inscribed in a circle centred around the axis of symmetry and in that the ratio between the diameter of the thread base of the threaded end and the diameter ($D_1$) of the circle of inscription is between approximately 1.32 and approximately 1.72.

3. A fixing member according to claim 2, characterised in that the recess comprises a central cylindrical hollow the diameter ($D_3$, $D3_u$) of which is equal to twice the third radius and in that the ratio between the diameter ($D_3$, $D_{3u}$) of the central cylindrical hollow and the diameter of the circle of inscription is between approximately 0.63 and approximately 0.88.

4. A fixing member according to claim 3, characterised in that the first radius ($R_1$) is defined by the formula:

$$R_1 = \tfrac{1}{2} \times (D_1 + D_{3,3u}) \times \lambda,$$

$D_1$ being the diameter of the circle of inscription,
$D_{3,3u}$ being the diameter of the central cylindrical hollow
$\lambda$ being a coefficient between approximately 0.06 and approximately 0.26.

5. A fixing member according to claim 4, characterised in that the ratio between the second radius and the first radius ($R_1$) is between approximately 0.66 and approximately 1.06.

6. A fixing member according to claim 1, characterised in that the peripheral edge of the recess comprises 3 to 7 lobes.

7. A testing gauge capable of testing at least one dimension of a recess of a fixing member according to claim 1, characterised in that it comprises a grippable body with at least two ends, and in that a first end is fitted with a male element capable of being inserted into a recess, complementary in shape, of a fixing member, with a raised shape comprising a peripheral edge in the form of a multilobed continuous curved line, characterised in that the cross-section of each lobe is defined by a continuous series of three arcs of a circle, i.e. a first convex arc of a circle with a first radius on either side of which a second concave arc of a circle with a second radius are positioned, and in that each lobe is connected to the adjacent lobe via a third convex arc of a circle with a third radius larger than the first radius.

8. A testing gauge according to claim 7, characterised in that it comprises a second male element at another end, with a circular cross-section chosen so as to have a radius larger than the third radius of the recess.

9. A testing gauge according to claim 7, characterised in that it comprises a third multilobed male element at another end, the cross-section of each lobe peak being formed by a convex arc of a circle with a radius larger than the first radius of the recess being checked, the third male element being inscribed in a circle with a larger diameter than the circle of inscription of the recess.

10. A testing gauge according to claim 7, characterised in that it comprises a fourth multilobed male element at another end, the cross-section of each lobe peak being formed by a convex arc of a circle with a radius smaller than the first radius of the recess being checked, the fourth male element being inscribed in a circle with the same diameter as the circle of inscription of the recess.

11. A testing gauge according to claim 7, characterised in that it comprises at least one conformity or non-conformity indicator for the recess being checked, positioned near to the first or another end.

12. A male element capable of being inserted into a recess, complementary in shape, of a fixing member, with a raised shape comprising a peripheral edge in the form of a multilobed continuous curved line, characterised in that the cross-section of each lobe is defined by a continuous series of three arcs of a circle, i.e. a first convex arc of a circle with a first radius ($R_{38}$), on either side of which a second concave arc of a circle with a second radius ($R_{40}$) are positioned, and in that each lobe is connected to the adjacent lobe via a third convex arc of a circle with a third radius ($R_{42}$) larger than the first radius ($R_{38}$).

13. A male element according to claim 12, characterised in that it comprises a central cylindrical section with a diameter ($D_{42}$) equal to twice the third radius ($R_{42}$), and in that it is inscribed in a circle tangent to the lobes and with a predefined diameter ($D_{44}$) so that the ratio between the diameter ($D_{42}$) of the central cylindrical section and the predefined diameter ($D_{44}$) of the circle of inscription is between approximately 0.63 and approximately 0.88.

14. A male element according to claim 13, characterised in that the first radius ($R_{38}$) is defined by the formula:

$$R_{38} = \tfrac{1}{2} \times (D_{42} + D_{44}) \times \lambda,$$

$D_{44}$ being the predefined diameter of the circle of inscription, $D_{42}$ being the diameter of the central cylindrical hollow, $\lambda$ being a coefficient of between approximately 0.06 and approximately 0.26.

15. A male element according to claim 14, characterised in that the ratio between the second radius ($R_{40}$) and the first radius ($R_{38}$) is between approximately 0.66 and approximately 1.06.

16. A male element according to claim 12, characterised in that the peripheral edge of the raised form comprises 3 to 7 lobes.

17. A handling tool comprising a tip capable of being inserted into a recess of a fixing member, characterised in that the tip has an end comprising a male element according to one of claims 12 to 15.

* * * * *